(12) United States Patent
Anzawa

(10) Patent No.: US 12,398,688 B2
(45) Date of Patent: Aug. 26, 2025

(54) CONTROL DEVICE FOR INTERNAL COMBUSTION ENGINE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/659,375

(22) Filed: May 9, 2024

(65) Prior Publication Data

US 2025/0067238 A1 Feb. 27, 2025

(30) Foreign Application Priority Data

Aug. 23, 2023 (JP) ................. 2023-135279

(51) Int. Cl.
*F02P 5/00* (2006.01)
*F02D 41/00* (2006.01)
(Continued)

(52) U.S. Cl.
CPC ............ *F02P 5/045* (2013.01); *F02D 41/008* (2013.01); *F02D 41/1497* (2013.01);
(Continued)

(58) Field of Classification Search
CPC ........ F02P 5/045; F02P 5/1502; F02P 5/1504; F02P 5/1512; F02D 41/008;
(Continued)

(56) References Cited

U.S. PATENT DOCUMENTS 4,936,277 A * 6/1990 Deutsch .................. F02D 41/22
123/436
5,265,575 A * 11/1993 Norota ................ F02D 41/1498
123/436
(Continued)

FOREIGN PATENT DOCUMENTS

EP 3205865 A1 8/2017
JP 2008-297933 A 12/2008
(Continued)

*Primary Examiner* — Phutthiwat Wongwian
*Assistant Examiner* — Sherman D Manley
(74) *Attorney, Agent, or Firm* — SoraIP, Inc.

(57) ABSTRACT

A control device for an internal combustion engine capable of performing ignition retardation control in which an ignition timing for igniting an air-fuel mixture in a combustion chamber is retarded from a normal operation. The device includes: an individual cylinder torque calculation unit that obtains a variation amount of combustion torque of each cylinder; an injection amount correction unit that corrects a fuel injection amount for each cylinder so as to reduce the variation amount of combustion torque of each cylinder obtained by the individual cylinder torque calculation unit; and a misfire determination unit that determines a misfire of a predetermined cylinder based on a combustion torque of the predetermined cylinder among the cylinders. When the combustion torque of any one of the cylinders is equal to or less than a predetermined torque, the injection amount correction unit does not correct the fuel injection amount for each cylinder.

11 Claims, 7 Drawing Sheets

(51) Int. Cl.
*F02D 41/14* (2006.01)
*F02D 41/38* (2006.01)
*F02P 5/04* (2006.01)
*F02P 5/15* (2006.01)

(52) U.S. Cl.
CPC ............ *F02D 41/38* (2013.01); *F02P 5/1502* (2013.01); *F02D 2200/1002* (2013.01); *F02D 2200/101* (2013.01)

(58) Field of Classification Search
CPC .... F02D 41/1497; F02D 41/38; F02D 41/029; F02D 41/1498; F02D 2200/1002; F02D 2200/101; F02D 2200/1015; F02D 37/02; F01N 11/00; F02B 77/083; Y02T 10/40
See application file for complete search history.

(56) References Cited

U.S. PATENT DOCUMENTS

| | | | | |
|---|---|---|---|---|
| 6,155,105 | A * | 12/2000 | Klenk | G01M 15/11 73/114.03 |
| 7,421,330 | B2 * | 9/2008 | Saikkonen | F02D 19/024 123/480 |
| 10,865,721 | B1 * | 12/2020 | Thomas | F02D 41/009 |
| 2008/0053400 | A1 * | 3/2008 | Haraguchi | F02D 41/2454 123/305 |
| 2011/0253101 | A1 * | 10/2011 | Mathews | F02P 5/045 123/406.27 |
| 2013/0096805 | A1 * | 4/2013 | Hoshi | G01M 15/046 73/114.25 |
| 2017/0122246 | A1 * | 5/2017 | Ottikkutti | F02D 41/401 |
| 2019/0285012 | A1 * | 9/2019 | Eser | F02D 41/401 |
| 2019/0376463 | A1 * | 12/2019 | Sixel | F02D 37/02 |
| 2020/0003137 | A1 * | 1/2020 | Pedder | F02D 19/081 |
| 2020/0011262 | A1 * | 1/2020 | Eser | F02D 41/3809 |
| 2020/0032737 | A1 * | 1/2020 | Eser | F02D 41/0085 |
| 2022/0112853 | A1 | 4/2022 | Sugimoto | |
| 2023/0016942 | A1 * | 1/2023 | Sukegawa | F02D 41/1498 |
| 2023/0400002 | A1 * | 12/2023 | Watanabe | F02P 5/1521 |

FOREIGN PATENT DOCUMENTS

| | | |
|---|---|---|
| JP | 2017-141791 A | 8/2017 |
| JP | 2022-062848 A | 4/2022 |

* cited by examiner

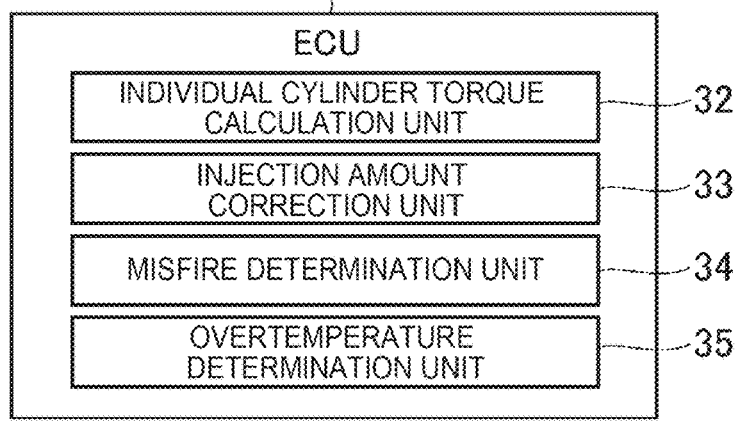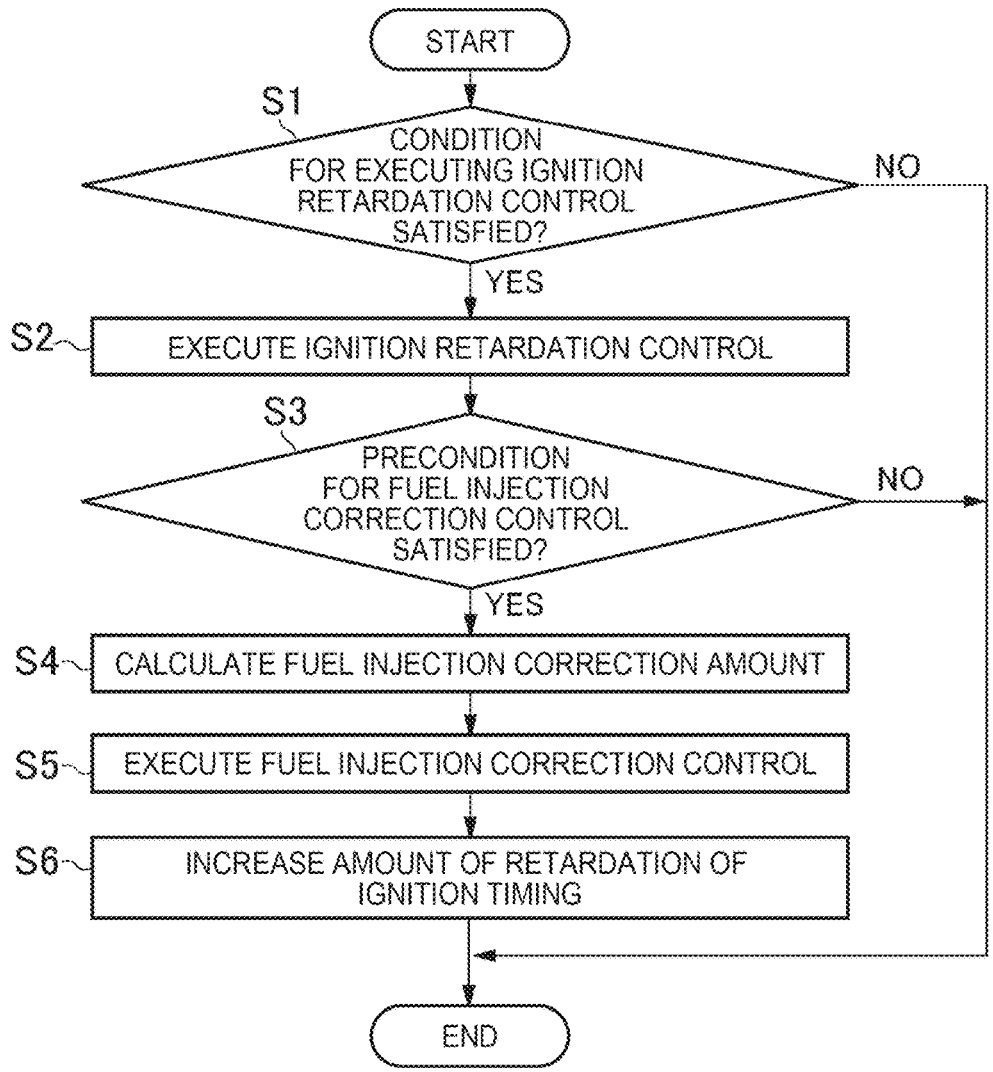

CONTROL DEVICE FOR INTERNAL COMBUSTION ENGINE

CROSS-REFERENCE TO RELATED APPLICATION

This application claims priority to Japanese Patent Application No. 2023-135279 filed on Aug. 23, 2023, incorporated herein by reference in its entirety.

BACKGROUND

1. Technical Field

The present disclosure relates to control devices for internal combustion engines that can change the timing of igniting an air-fuel mixture.

2. Description of Related Art

Japanese Unexamined Patent Application Publication No. 2008-297933 (JP 2008-297933 A) describes a control device configured to retard the ignition timing of an engine from the ignition timing during a normal operation when warming up a catalytic device for reducing exhaust emissions from the engine. The control device calculates crankshaft rotational speeds in order to reduce a difference in generated torque among cylinders that is caused by retarding the ignition timing to warm up the catalytic device as described above. The control device controls the fuel injection amounts of the individual cylinders so as to reduce the amount of variation among the calculated crankshaft rotational speeds.

Japanese Unexamined Patent Application Publication No. 2017-141791 (JP 2017-141791 A) describes a control device configured to burn and remove particulate matter (PM) deposited on a gasoline particular filter (GPF), namely a filter that captures PM in exhaust emissions from an engine, by raising the temperature of the GPF. The control device determines to execute GPF regeneration control for burning and removing PM, when the differential pressure before and after the GPF becomes equal to or higher than a predetermined pressure. When the control device determines that it is necessary to perform the GPF regeneration control, the control device retards the ignition timing of the engine from the ignition timing when the GPF regeneration control is not executed. The control device reduces a decrease in engine output due to execution of the GPF regeneration control by reducing the opening degree of a wastegate valve and increasing a boost pressure.

Japanese Unexamined Patent Application Publication No. 2022-062848 (JP 2022-062848 A) describes a control device configured to appropriately determine a misfire even when combustion in an engine becomes unstable as a result of retarding the ignition timing in order to warm up a catalyst. The control device determines whether there is a misfire based on the amount of change in measurement time required for a crankshaft to rotate by 30° C. A by combustion in a cylinder to be determined. Specifically, when retardation control for warming up the catalyst is not executed, the control device subtracts the measurement time in one cycle before from the most recent measurement time. When the value obtained by subtracting the measurement time in one cycle before from the most recent measurement time is equal to or greater than a predetermined time, the control device determines that a misfire has occurred. When the retardation control is performed, the control device extracts five shortest measurement times from the measurement times in the past 10 cycles, obtains an average value of the five measurement times, and subtracts the average value from the most recent measurement time. When the value obtained by subtracting the average value from the most recent measurement time is equal to or greater than the predetermined time, the control device determines that a misfire has occurred.

SUMMARY

The control devices described in JP 2008-297933 A and JP 2017-141791 A retard the ignition timing of the engine when warming up the catalytic device or regenerating the GPF. In order to reduce a variation among crankshaft rotational speeds due to combustion in the engine becoming unstable as a result of retarding the ignition timing of the engine, the control device described in JP 2008-297933 A is configured to control the amounts of fuel to be injected into the individual cylinders based on the variation among the crankshaft rotational speeds. That is, the control device described in JP 2008-297933 A reduces a variation among the crankshaft rotational speeds.

On the other hand, the control device described in JP 2022-062848 A determines whether there is a misfire based on the amount of change in time required for the crankshaft to rotate by a predetermined crank angle. Therefore, when the fuel injection amounts are controlled so as to reduce a variation among the crankshaft rotational speeds as in the control device described in JP 2008-297933 A, the fuel injection amount for the cylinder whose crankshaft rotational speed has changed due to a misfire is changed, so that the crankshaft rotational speeds are equalized. Therefore, the time required for the crankshaft to rotate by the predetermined crank angle is also equalized. As a result, it may not be possible to determine whether there is a misfire.

The present disclosure was made in view of the above technical problem, and it is an object of the present disclosure to provide a control device for an internal combustion engine that can reduce the possibility that a misfire cannot be determined as a result of correcting the amounts of fuel to be injected into individual cylinders and thus equalizing combustion torques of the individual cylinders.

In order to achieve the above object, the present disclosure provides a control device for an internal combustion engine that is configured to perform ignition retardation control for retarding an ignition timing of igniting an air-fuel mixture in a combustion chamber from the ignition timing during a predetermined normal operation.

The control device includes a controller configured to control the internal combustion engine.

The controller includes
- an individual cylinder torque calculation unit configured to obtain an amount of variation among combustion torques of individual cylinders during execution of the ignition retardation control,
- an injection amount correction unit configured to correct fuel injection amounts for the individual cylinders so as to reduce the amount of variation among the combustion torques of the individual cylinders obtained by the individual cylinder torque calculation unit, and
- a misfire determination unit configured to determine a misfire in a predetermined one of the individual cylinders based on the combustion torque of the predetermined cylinder or a rotational speed of the internal combustion engine.

When the combustion torque of any of the individual cylinders is equal to or less than a predetermined torque, the injection amount correction unit does not correct the fuel injection amounts for the individual cylinders.

The present disclosure also provides a control device for an internal combustion engine that is configured to perform ignition retardation control for retarding an ignition timing of igniting an air-fuel mixture in a combustion chamber from the ignition timing during a predetermined normal operation.

The control device includes a controller configured to control the internal combustion engine. The controller includes
an individual cylinder torque calculation unit configured to obtain an amount of variation among combustion torques of individual cylinders during execution of the ignition retardation control,
an injection amount correction unit configured to correct fuel injection amounts for the individual cylinders so as to reduce the amount of variation among the combustion torques of the individual cylinders obtained by the individual cylinder torque calculation unit, and
a misfire determination unit configured to determine a misfire in a predetermined one of the individual cylinders based on either the combustion torque or a rotational speed of the internal combustion engine that is associated with combustion in the predetermined cylinder and on a predetermined determination threshold.

When the fuel injection amounts for the individual cylinders are corrected by the injection amount correction unit, the misfire determination unit corrects the determination threshold by a change in the torque or the rotational speed that corresponds to an amount of correction of the fuel injection amount for the predetermined cylinder.

The present disclosure further provides a control device for an internal combustion engine that is configured to perform ignition retardation control for retarding an ignition timing of igniting an air-fuel mixture in a combustion chamber from the ignition timing during a predetermined normal operation.

The control device includes a controller configured to control the internal combustion engine.

The controller includes
an individual cylinder torque calculation unit configured to obtain an amount of variation among combustion torques of individual cylinders during execution of the ignition retardation control,
an injection amount correction unit configured to correct fuel injection amounts for the individual cylinders so as to reduce the amount of variation among the combustion torques of the individual cylinders obtained by the individual cylinder torque calculation unit, and
a misfire determination unit configured to determine a misfire in a predetermined one of the individual cylinders based on either the combustion torque or a rotational speed of the internal combustion engine that is associated with combustion in the predetermined cylinder and on a predetermined determination threshold.

When the fuel injection amounts for the individual cylinders are corrected by the injection amount correction unit, the misfire determination unit corrects the combustion torque or the rotational speed by a change in the torque or the rotational speed that corresponds to an amount of correction of the fuel injection amount for the predetermined cylinder.

In the present disclosure,
the control device may further include a filter configured to capture particulate matter contained in exhaust emissions discharged from the individual cylinders.

The controller may further include
an overtemperature determination unit configured to determine abnormal heating of the filter when an occurrence rate of the misfire determined by the misfire determination unit is equal to or higher than a predetermined rate.

In the present disclosure,
the overtemperature determination unit may set the predetermined rate when the fuel injection amounts for the individual cylinders are corrected to a value smaller than the predetermined rate when the fuel injection amounts for the individual cylinders are not corrected.

In the present disclosure,
when the fuel injection amounts for the individual cylinders are corrected, the overtemperature determination unit may determine that the abnormal heating of the filter has occurred when the occurrence rate of the misfire determined by the misfire determination unit is equal to or higher than the predetermined rate multiplied by a factor smaller than 1.

In the present disclosure,
the overtemperature determination unit may include a three-dimensional map that determines the predetermined rate using the rotational speed of the internal combustion engine, a load of the internal combustion engine, and an amount of retardation of the ignition timing as parameters.

According to the present disclosure, the control device includes the injection amount correction unit configured to correct the fuel injection amounts for the individual cylinders so as to reduce a variation among the combustion torques of the individual cylinders during execution of the ignition retardation control for retarding the ignition timing from the ignition timing during a normal operation. Correcting the fuel injection amounts for the individual cylinders in this manner can reduce the variation among the combustion torques during execution of the ignition retardation control, and therefore can reduce vibration. When the combustion torque of any of the individual cylinders is equal to or less than the predetermined torque, the injection amount correction unit does not correct the fuel injection amounts. That is, when there is a possibility that a misfire may have occurred in any of the cylinders, the fuel injection amounts are not corrected. In other words, the fuel injection amounts are corrected only when there is a possibility that no misfire may have occurred in any of the cylinders. This can reduce the possibility that determination of a misfire based on the combustion torques of the cylinders and the rotational speed of the internal combustion engine cannot be made as a result of correcting the fuel injection amounts.

According to the present disclosure, when the fuel injection amounts for the individual cylinders are corrected, the determination threshold for determining a misfire is corrected by a value corresponding to the amount of correction of the fuel injection amount for the predetermined cylinder, or the combustion torque or rotational speed for determining a misfire is corrected by a value corresponding to the amount of correction of the fuel injection amount for the predetermined cylinder. That is, the detection value or threshold for determining a misfire is corrected in consideration of the correction of the fuel injection amounts. Therefore, it is possible to reduce a variation among the combustion torques caused by execution of the ignition retardation control and also determine a misfire. In other words, it is possible to reduce vibration due to a variation among the combustion torques while determining a misfire. As a result, the ignition retardation control can be facilitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram for explaining a configuration of an ECU;

FIG. 3 is a flowchart for explaining an example of fuel injection correction control;

DETAILED DESCRIPTION OF EMBODIMENTS

Figure 1:
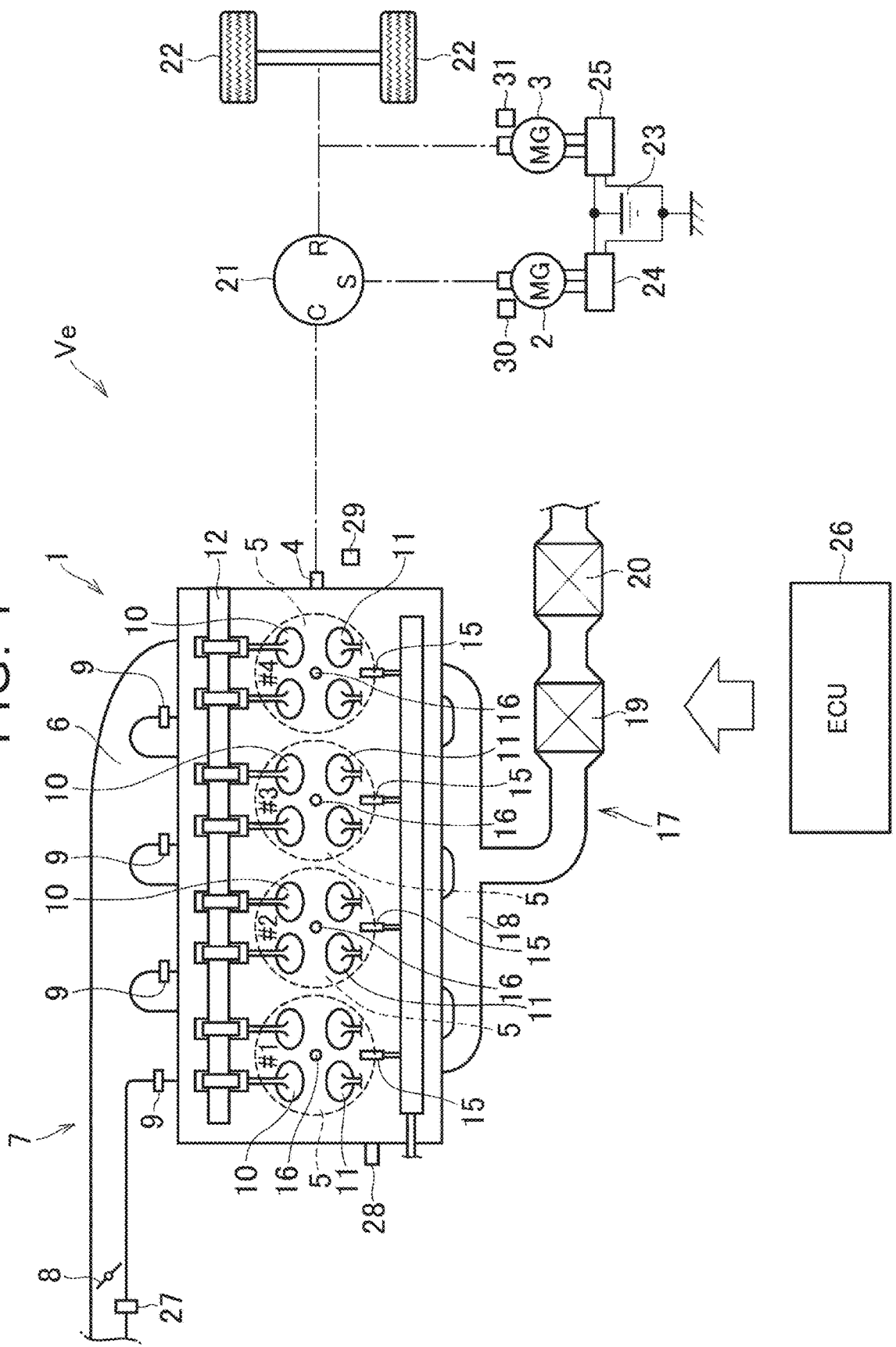
FIG. 1 is a diagram schematically showing an exemplary hybrid electric vehicle equipped with an internal combustion engine according to an embodiment of the present disclosure.

The present disclosure will be described with reference to the embodiments shown in the drawings. Note that the embodiments described below are merely examples of a case where the present disclosure is embodied, and are not intended to limit the present disclosure.

FIG. 1 schematically illustrates an exemplary hybrid electric vehicle equipped with an internal combustion engine (hereinafter referred to as an engine) according to an embodiment of the present disclosure. A hybrid electric vehicle (hereinafter, simply referred to as a vehicle) Ve shown in FIG. 1 includes an engine 1, a first motor 2, and a second motor 3 as a driving force source.

The engine 1 illustrated in FIG. 1 is a four-cylinder engine 1 including four cylinders #1, #2, #3, and #4. In the cylinder #1, #2, #3, and #4, a piston is reciprocally provided on a crankshaft 4, which is an output shaft of the engine 1, via a connecting rod (not shown), and fuel and air are supplied to a combustion chamber 5, which is a space above the piston. Then, the crankshaft 4 is rotated by a load that pushes down the piston by burning an air-fuel mixture.

An intake passage 7 is connected to each combustion chamber 5 via an intake manifold 6. The intake passage 7 is configured to allow outside air to flow through an air cleaner (not shown), and a throttle valve 8 for controlling a flow rate (air amount) of the air is disposed on the upstream side. Therefore, as the opening degree of the throttle valve 8 increases, the amount of air flowing in the intake passage 7 increases.

The intake manifold 6 branches and supplies the air flowing through the intake passage 7 to the cylinders #1, #2, #3, and #4, and is connected to the downstream-side of the intake passage 7. In each of the branched flow paths of the intake manifold 6, a port injection valve 9 for injecting fuel toward intake ports provided in the cylinders #1, #2, #3, and #4 is provided.

In the cylinders #1, #2, #3, and #4 shown in FIG. 1, two intake ports and two exhaust ports are formed, and an intake valve 10 for opening and closing the intake port and an exhaust valve 11 for opening and closing the exhaust port are provided. The intake valve 10 and the exhaust valve 11 are configured to be opened and closed by a camshaft 12 that rotates in synchronization with the crankshaft 4 via a timing belt (not shown) or the like.

Further, the cylinders #1, #2, #3, and #4 are provided with an in-cylinder injection valve 15 for injecting fuel into the combustion chamber 5 and an ignition plug 16 for igniting the air-fuel mixture in the combustion chamber 5. Therefore, the intake valve 10 is opened, and the air and the fuel injected from the port injection valve 9 are supplied into the combustion chamber 5, and further, the fuel is injected from the in-cylinder injection valve 15, whereby the air-fuel mixture is formed in the combustion chamber 5. By igniting the air-fuel mixture by the ignition plug 16 and burning the air-fuel mixture, a load for pushing down the piston is generated.

An exhaust passage 17 for discharging the exhaust gas generated by burning the air-fuel mixture as described above is connected to the respective cylinders #1, #2, #3, and #4 via the exhaust manifold 18. In the exhaust passage 17, a three-way catalyst (hereinafter, referred to as a catalytic device) 19 for removing hydrocarbons, carbon monoxide, and nitrogen oxides contained in exhaust emissions by oxidization and reduction, and a gasoline particulate filter (hereinafter, referred to as a GPF) 20 for capturing particulate matter (hereinafter, referred to as a PM) contained in the exhaust gas are arranged in this order from the upstream side.

A power split mechanism 21 is connected to the crankshaft 4. The power split mechanism 21 can be constituted by a single pinion type planetary gear mechanism. A crankshaft 4 is connected to a carrier C of the power split mechanism 21. The first motor 2 is connected to the sun gear S. A drive wheel 22 is connected to the ring gear R via a gear train portion (not shown). The second motor 3 is connected to a gear train portion between the ring gear R and the drive wheels 22.

Therefore, the output torque of the engine 1 is divided and transmitted to the first motor 2 and the drive wheels 22 in accordance with the gear ratio of the power split mechanism 21. By outputting torque from the second motor 3, the output torque of the second motor 3 can be applied to the torque transmitted to the drive wheels 22.

The above motors 2, 3 can be configured in the same manner as a motor provided as a driving force source of a conventional battery electric vehicle or hybrid electric vehicle. That is, in addition to a function as a motor that outputs a drive torque by being supplied with electric power, a function as a generator that converts a part of the power of the output shaft into electric power by being rotated together with the output shaft is provided. As the motors 2 and 3, for example, a permanent magnet synchronous motor or an induction motor can be employed.

Therefore, an energy storage device 23 serving as a power source for the motors 2, 3, a first inverter 24, and a second inverter 25 are provided. The first inverter 24 and the second inverter 25 are configured to convert the DC power output from the energy storage device 23 into AC power and output the AC power to the motors 2, 3, and to convert the AC power generated by the motors 2, 3 into DC power and output the DC power to the energy storage device 23.

Further, the vehicle Ve shown in FIG. 1 is provided with a throttle valve 8, a ignition plug 16, a port injection valve 9, an in-cylinder injection valve 15, and an electronic control device (hereinafter referred to as a ECU) 26 for controlling the inverters 24 and 25. ECU 26 is mainly composed of a microcomputer as in a ECU provided in conventional vehicles. ECU 26 is configured to determine a fuel injection amount to the engine 1, an ignition timing for igniting the air-fuel mixture, an output torque and a rotational speed of the first motor 2 and the second motor 3, and the like based on the inputted signal and a map, an arithmetic expression, and the like stored in advance, and to output the signal to the throttle valve 8, the ignition plug 16, the port injection valve 9, the in-cylinder injection valve 15, and the inverters 24 and 25. Note that ECU 26 may correspond to "controllers" in the embodiments of the present disclosure. ECU 26 is not limited to a single one, and may include an engine ECU for controlling the engine 1 and a motor ECU for controlling the motors 2 and 3, and may be configured to communicate between ECU to define the respective output signals.

The sensor for inputting a signal to ECU 26 includes, for example, an airflow meter 27 for detecting an air amount flowing through the intake passage 7, a water temperature sensor 28 for detecting an engine water temperature, a crank angle sensor 29 for detecting a rotation angle (crank angle) of the crankshaft 4, a first resolver 30 for detecting a rotational speed of the first motor 2, and a second resolver 31 for detecting a rotational speed of the second motor 3.

FIG. 2 is a diagram for explaining the configuration of ECU 26. ECU 26 illustrated in FIG. 2 includes an individual cylinder torque calculation unit 32, an injection amount correction unit 33, a misfire determination unit 34, and an overtemperature determination unit 35. The individual cylinder torque calculation unit 32 obtains the amount of variation among the output torques (combustion torques) of the cylinders #1, #2, #3, and #4. For example, the combustion torque generated by combustion of the air-fuel mixture by the first cylinder #1 is obtained from the torque acting on the first motor 2 at that time. Specifically, the combustion torque of the first cylinder #1 is obtained based on the reaction torque based on the command value to the first motor 2, the inertia torque obtained by multiplying the rate of change of the rotational speed of the first motor 2 by the moment of inertia of the first motor 2, the gear ratio of the power split mechanism 21, and the inertia torque of the engine 1. Similarly, the combustion torques of the second cylinder #2, the third cylinder #3, and the fourth cylinder #4 are obtained. Then, the difference between the average value (average torque) of the combustion torques of the cylinders #1, #2, #3, and #4 and the combustion torques of the individual cylinders #1, #2, #3, and #4 is obtained as the amount of variation.

The injection amount correction unit 33 corrects the amounts of fuel to be injected into the cylinders #1, #2, #3, and #4 so as to reduce the amount of variation among the combustion torques obtained by the individual cylinder torque calculation unit 32. For example, when the combustion torque of the first cylinder #1 is higher than the average torque, the fuel quantity to be injected into the first cylinder #1 is decreased in accordance with the torque differential. When the combustion torque of the first cylinder #1 is lower than the average torque, the fuel quantity to be injected into the first cylinder #1 is increased in accordance with the torque differential.

The misfire determination unit 34 determines whether a misfire has occurred in each cylinder #1, #2, #3, #4. For example, the combustion torque generated by burning the air-fuel mixture by the predetermined cylinder #1 (#2, #3, #4) to be determined at all times is obtained from the torque acting on the first motor 2 at that time. Then, when the difference between the combustion torque at the time of the determination and the previous combustion torque at the predetermined cylinder #1 (#2, #3, #4) is equal to or greater than a predetermined difference, it is determined that a misfire has occurred in the predetermined cylinder #1 (#2, #3, #4). Alternatively, when the difference between the combustion torque at the time of the determination and the average value of the combustion torque of the predetermined number of times in the predetermined cylinder #1 (#2, #3, #4) is equal to or more than the predetermined difference, it is determined that a misfire has occurred in the predetermined cylinder #1 (#2, #3, #4). Alternatively, in order to determine that a complete misfire in the predetermined cylinder #1 (#2, #3, #4) has occurred such as the predetermined cylinder #1 (#2, #3, #4) having failed to fire, it is determined that a misfire has occurred in the predetermined cylinder #1 (#2, #3, #4) when the difference from the combustion torque of another cylinder #2 (#1, #3, #4) is a predetermined difference or more.

That is, the misfire determination unit 34 determines a misfire in the predetermined cylinder #1 (#2, #3, #4) based on the combustion torque during determination in the predetermined cylinder #1 (#2, #3, #4) and a predetermined determination threshold using the past combustion torque or an average value of the past combustion torques or the combustion torque #2 (#1, #3, #4) as the predetermined determination threshold.

Note that the misfire determination unit 34 may determine that a misfire has occurred, for example, by comparing the rotation variation amount of the crankshaft 4 (that is, the rotational speed of the engine 1) at the time of misfire determination with the rotation variation amount of the crankshaft 4 (the crank angle) prior to 720° C. A, as in the control device described in JP 2022-062848 A. In this case, the rotational variation prior to 720° C. A becomes "predetermined determination thresholds" in the present embodiment.

The overtemperature determination unit 35 determines whether or not the temperature of GPF 20 is equal to or higher than the allowable upper limit temperature. Specifically, it is determined that the temperature of GPF 20 is equal to or higher than the allowable upper limit temperature when the occurrence rate (the number of times of occurrence) of misfire of the engine 1 is equal to or higher than a predetermined rate (a predetermined number of times) determined in advance in accordance with the operating condition of the engine 1.

The engine 1 configured as described above can perform catalyst warm-up control for raising the temperature of the catalytic device 19 to the activation temperature. This catalyst warm-up control is executed when the floor temperature of the catalytic device 19 is equal to or less than a predetermined temperature (activation temperature). The catalyst warm-up control includes a HV catalyst warm-up control in which the catalytic device 19 is retarded from the ignition timing in the normal operation in which the temperature is raised to the activation temperature. The catalyst warm-up control includes a rapid catalyst warm-up control for performing stratified injection combustion in which the amount of retardation of the ignition timing is larger than that of HV catalyst warm-up control, and fuel is injected into the combustion chamber 5 from the in-cylinder injection valve 15 at a later stage of the compression stroke, so that the vicinity of the ignition plug 16 is rich at the ignition timing. Note that the rapid catalyst warm-up control can increase the temperature rise rate of the catalytic device 19 rather than HV catalyst warm-up control.

In addition, it is possible to perform GPF regeneration control for recovering the capturing function of the GPF 20 when PM deposited on the GPF 20 becomes equal to or more than a predetermined quantity. GPF regeneration control is a control for burning and removing PM deposited on GPF 20 by supplying oxygen-containing air to GPF 20. Specifically, GPF regeneration control retards the ignition timing more than when GPF regeneration control is not executed.

In the warm-up control and GPF regeneration control described above, the individual cylinders #1, #2, #3, and #4 are unstable in accordance with the retarding of the ignition timing. That is, the combustion torques generated in the individual cylinders #1, #2, #3, and #4 may vary, and the engine 1 may excessively vibrate. Therefore, when the ignition retardation control for retarding the ignition timing is executed, the control device according to the present embodiment is configured to correct the amounts of fuel to be injected into the individual cylinders #1, #2, #3, and #4 in order to suppress the variation in the combustion torques generated in the individual cylinders #1, #2, #3, and #4.

FIG. 3 is a flowchart for explaining a control example for suppressing a variation in combustion torque caused by execution of the ignition retardation control. In the control illustrated in FIG. 3, first, it is determined whether or not the condition for executing the ignition retardation control is satisfied (S1). Specifically, it is determined whether there is a request to execute HV catalyst warm-up control or the rapid catalyst warm-up control, or whether there is a request to execute GPF regeneration control. That is, it is determined whether or not the catalytic bed temperature is lower than a predetermined activation temperature, and whether or not the pressure upstream of GPF 20 is higher than the pressure downstream by a predetermined pressure or more.

When No in S1 because the condition for executing the ignition retardation control is not satisfied, the routine is terminated once. On the contrary, when yes in S1 because the condition for executing the ignition retardation control is satisfied, the ignition retardation control is executed (S2).

Next, it is determined whether the precondition for the fuel injection amount correction control is satisfied (S3). This S3 is a step for determining whether the combustion torques can be detected in order to determine the amount of variation among the combustion torques. In the control example shown here, the first motor 2 is configured to detect the combustion torques of the individual cylinders #1, #2, #3, and #4. Therefore, S3 determines, for example, whether the first motor 2 or the resolver 30 that detects the rotational speed of the first motor is functioning normally.

When No in S3 because the precondition for the fuel injection amount correction control is not satisfied, this routine is terminated once. On the contrary, when the precondition for the fuel injection amount correction control is satisfied and the determination is affirmative in S3, the correction amount of the fuel injection amounts to the individual cylinders #1, #2, #3, and #4 is calculated (S4). Specifically, first, the individual cylinder torque calculation unit 32 sequentially obtains the combustion torques of the individual cylinders #1, #2, #3, and #4 based on the torque acting on the first motor 2, and calculates the averaged torque of the obtained combustion torque. Subsequently, differences between the combustion torques of the individual cylinders #1, #2, #3, and #4 and the average torque are calculated to calculate the amount of variation. In other words, the cylinders #1, #2, #3, and #4 are corrected to reduce the amount of variation. Then, the correction amount of the fuel injection amount is calculated by multiplying the correction torque by a predetermined factor in which the fuel amount and the torque are associated with each other. In a case where the difference between the combustion torque and the average torque is equal to or less than a predetermined difference, such as a small difference that does not affect the vibration of the vehicle, the correction torque may be set to "0".

Next, fuel-injection correction control for the individual cylinders #1, #2, #3, and #4 is executed (S5). That is, the fuel injection amount is increased in a cylinder in which the combustion torque is smaller than the average torque, and the combustion injection amount is decreased in a cylinder in which the combustion torque is larger than the average torque. Then, in this exemplary control, the amount of retardation of the ignition timing is further increased (S6), and the routine is terminated once. This S6 can reduce the variation in the combustion torque by correcting the fuel injection amount as described above, so that the temperature increase rate of the catalytic device 19 is further increased or the regeneration process of GPF 20 is performed quickly. Therefore, the amount of retardation to be added is determined so that the variation amount of the fuel torque is within an allowable range. Note that the steps of retarding the ignition timing by S6 further need not be performed.

When the ignition retardation control is executed in this manner, the fuel injection correction control is executed, so that the fuel injection amounts for the individual cylinders #1, #2, #3, and #4 are corrected even if the combustion becomes unstable due to the ignition retardation control. Therefore, it is possible to reduce the variation in the combustion torque. That is, it is possible to suppress the vibration of the vehicle caused by the variation of the combustion torque. In addition, since the amount of retardation of the ignition timing can be increased as compared with the cases where the fuel injection amounts for the individual cylinders #1, #2, #3, and #4 are not corrected, the temperature of the catalytic device 19 can be rapidly increased or the regeneration process of GPF 20 can be quickly performed.

On the other hand, as described above, the misfire determination unit 34 determines the misfire in the predetermined cylinder #1 (#2, #3, and #4) based on the rotational fluctuation amount corresponding to the combustion torque and the combustion torque at the time of determination in the predetermined cylinder #1 (#2, #3, and #4) and the predetermined determination threshold. Therefore, there is a possibility that a misfire cannot be determined as a result of correcting the fuel injection amounts.

Figure 4:
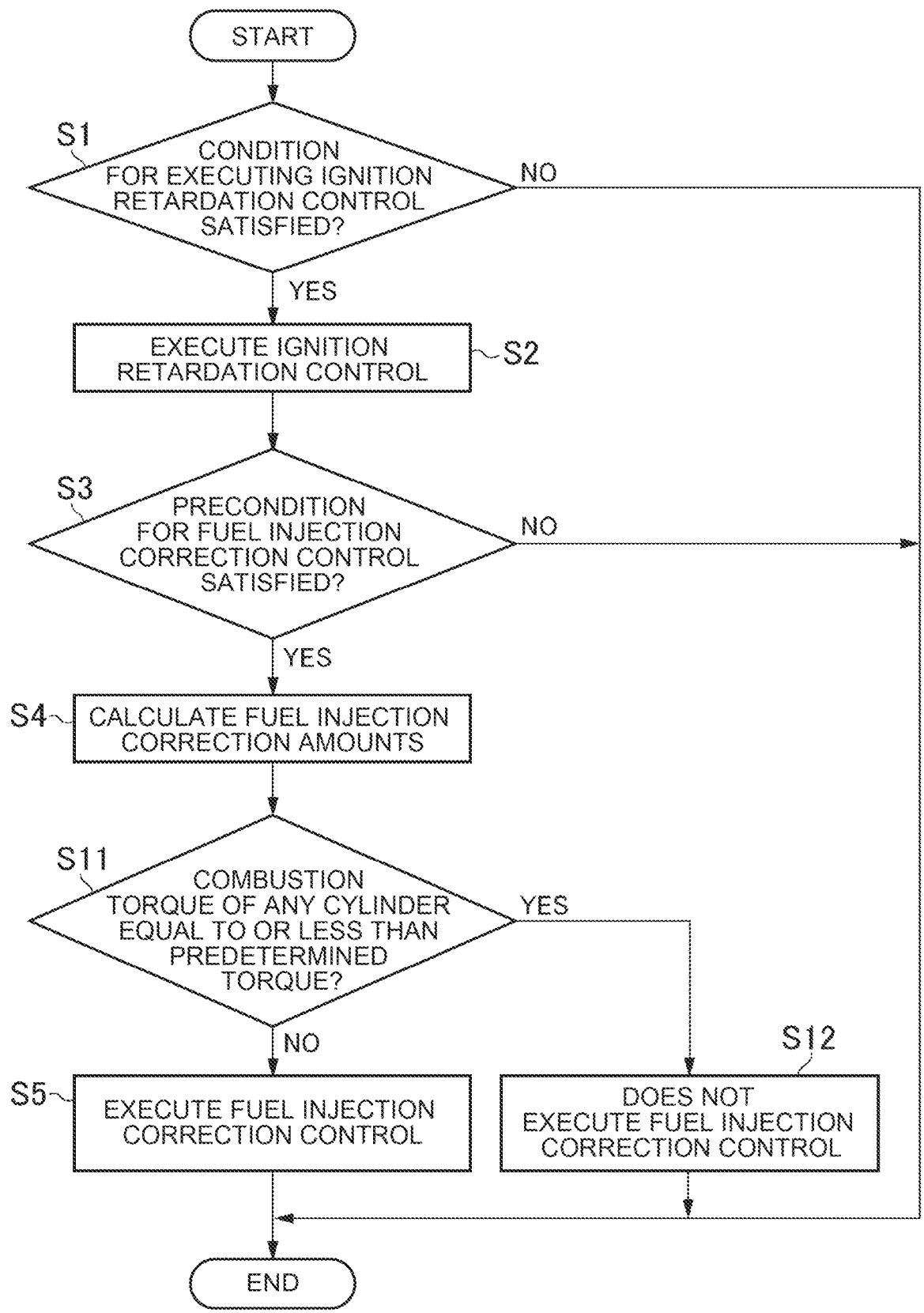
FIG. 4 is a flowchart for explaining an example of control enabling misfire determination.

Therefore, the control device according to the embodiment of the present disclosure is configured so as not to correct the fuel injection amount when there is a possibility that a misfire occurs. A flowchart for explaining an example of the control is shown in FIG. 4. Note that the same steps as those of the control example shown in FIG. 3 are denoted by the same reference numerals, and the description thereof is omitted.

In the control illustrated in FIG. 4, following S4, it is determined whether or not the combustion torque of any of the cylinders is equal to or less than a predetermined torque (S11). This S11 is a step for determining whether there is a possibility that a misfire has occurred in any of the cylinders.

Therefore, the predetermined torque can be set to the magnitude of the torque generated when the misfire occurs or the magnitude of the torque slightly larger than the magnitude of the torque.

When the combustion torque of any one of the cylinders is equal to or less than the predetermined torque and S11 is determined to be positive, the misfire cannot be determined if the fuel injection amount is corrected so as to reduce the amount of variation among the combustion torques of the individual cylinders #1, #2, #3, and #4. Further, for example, in a case where the fire cannot be performed and a misfire has occurred, the combustion torque of the cylinder is approximately zero. Therefore, when the amount of variation among the combustion torques of the individual cylinders #1, #2, #3, and #4 is reduced, the fuel injection amount to the cylinder is increased, and in such a case, there is a possibility that the fuel hammer is generated due to an excessive amount of fuel in the combustion chamber 5. Therefore, if the determination is affirmative in S11, the fuel-injection-correction control is not executed (S12), and the routine is terminated once.

On the contrary, when the combustion torque of all the cylinders is higher than the predetermined torque and thus a negative determination is made in S11, the fuel injection correction control is executed for the individual cylinders #1, #2, #3, and #4 (S5). That is, the fuel injection amount is increased in a cylinder in which the combustion torque is smaller than the average torque, and the combustion injection amount is decreased in a cylinder in which the combustion torque is larger than the average torque, and this routine is temporarily ended.

As described above, since the combustion torque of any of the cylinders is equal to or less than the predetermined torque, the fuel injection correction control is prohibited when there is a possibility that a misfire occurs in the cylinder. In other words, the combustion injection correction control is executed only when there is no possibility of a misfire occurring. That is, the determination of the presence or absence of misfire is given priority to suppressing the variation in the combustion torque. This can reduce the possibility that whether there is a misfire cannot be determined as a result of execution of the fuel injection correction control.

Figure 5:
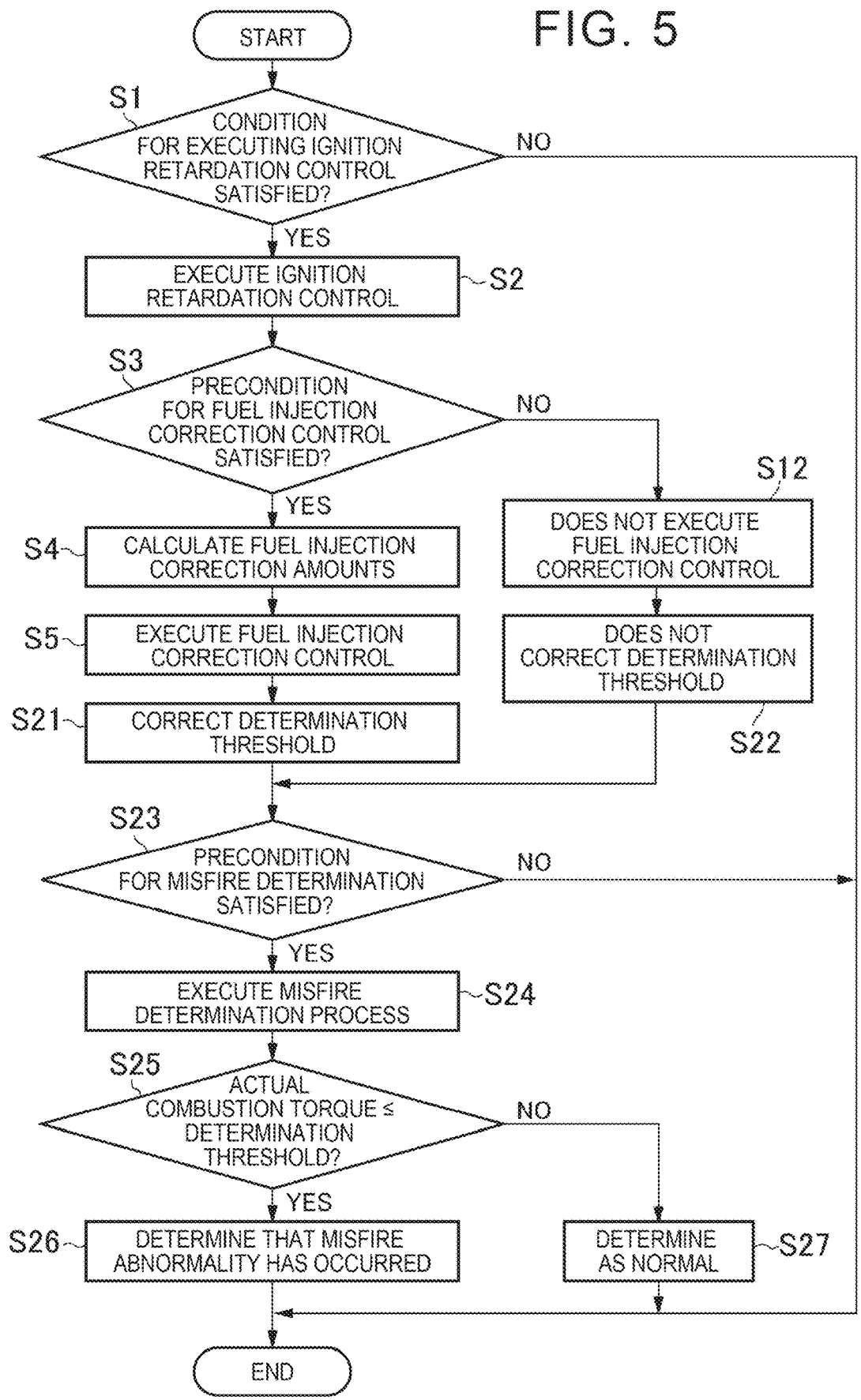
FIG. 5 is a flowchart for explaining a control example for correcting a misfire determination threshold to determine the presence or absence of misfire.
Figure 6:
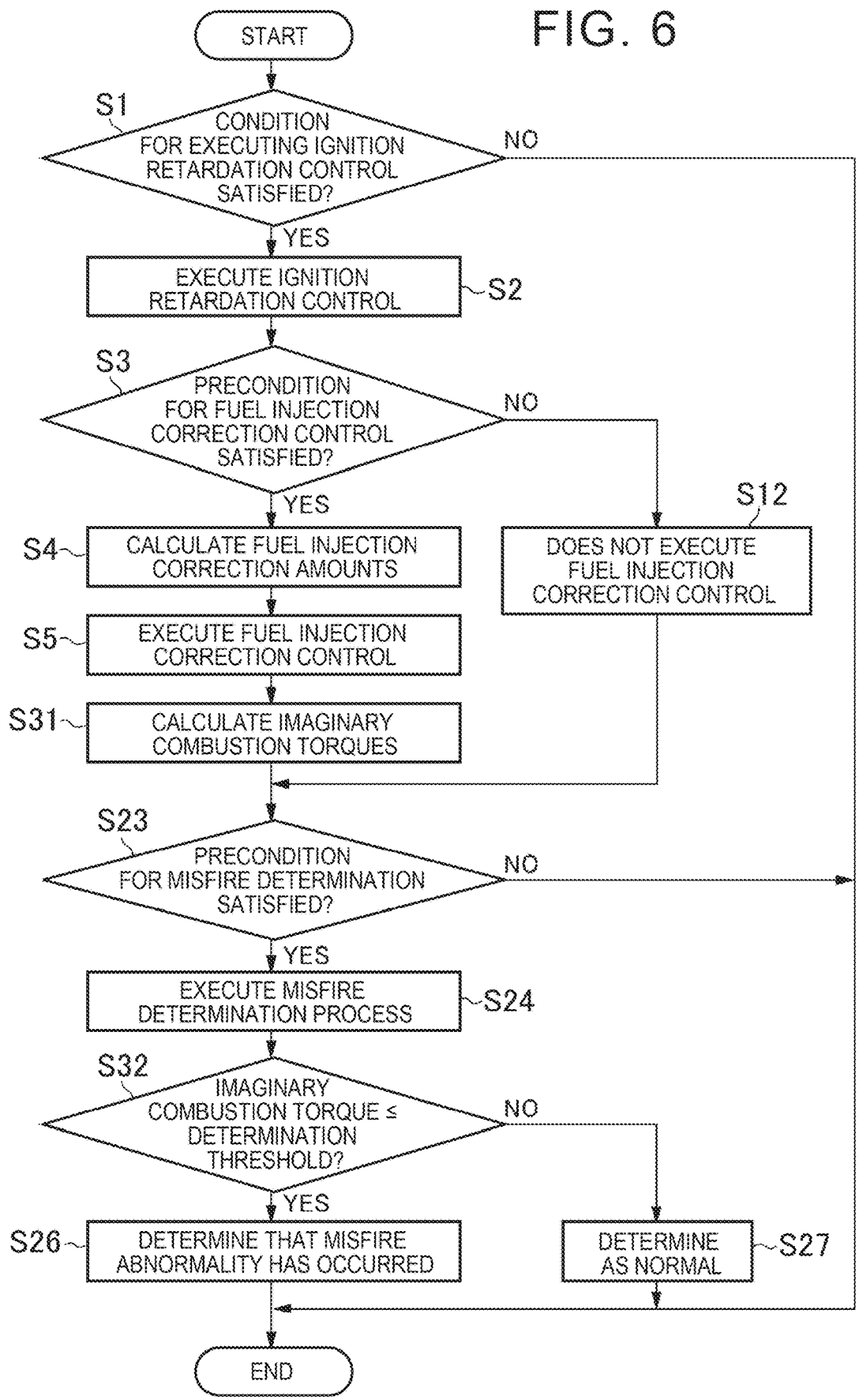
FIG. 6 is a flowchart for explaining a control example of correcting an actual combustion torque to determine the presence or absence of misfire.

FIG. 5 and FIG. 6 are flowcharts for explaining a control example in which the correction of the fuel injection amount for suppressing the variation in the combustion torque and the determination of the misfire can be compatible with each other. The control example illustrated in FIG. 5 is configured to compare the combustion torque after the fuel injection amount is corrected, the rotational fluctuation amount of the crankshaft 4, and the corrected determination threshold value to determine the presence or absence of misfire by correcting the determination threshold value for determining the presence or absence of misfire. Note that the same steps as those of the control example shown in FIGS. 3 and 4 are denoted by the same reference numerals, and the description thereof will be omitted.

In the control illustrated in FIG. 5, after the fuel-injection correction control is executed by S5, the misfire determination unit 34 corrects the determination thresholds for determining the presence or absence of misfire (S21). That is, when the misfire determination unit 34 compares the combustion torque at the time when the routine is executed with the past combustion torque to determine whether or not there is a misfire, the past combustion torque is corrected. Specifically, when the fuel injection amount of the predetermined cylinder #1 (#2, #3, and #4) is increased, the torque increased by increasing the fuel injection amount is added to the previous combustion torque before correcting the fuel injection amount. On the contrary, when the fuel injection amount of the predetermined cylinder #1 (#2, #3, and #4) is reduced, the torque reduced by reducing the fuel injection amount is subtracted from the previous combustion torque before correcting the fuel injection amount. Incidentally, the amount of increase or decrease in the combustion torque due to the correction of the fuel injection amount can be obtained by, for example, multiplying the correction amount of the fuel injection amount by a predetermined factor.

Similarly, when the misfire determination unit 34 compares the combustion torque at the time when the routine is executed with the average value of the past combustion torque before the correction of the fuel injection amount to determine the presence or absence of the misfire, the average value of the past combustion torque before the correction of the fuel injection amount is corrected. In addition, when the misfire determination unit 34 compares the combustion torque at the time point when the routine is executed with the combustion torque of another cylinder to determine the presence or absence of misfire, the combustion torque of the other cylinder is corrected.

Further, when the misfire determination unit 34 determines that a misfire has occurred by comparing the rotation fluctuation amount of the crankshaft 4 at the time of misfire determination with the rotation fluctuation amount of the crank angle before the predetermined angle, or the like, it corrects the rotation fluctuation amount before the predetermined angle. Specifically, first, an increase/decrease amount of the combustion torque due to the correction of the fuel injection amount is obtained by, for example, multiplying the correction amount of the fuel injection amount by a predetermined factor. Since the rotation fluctuation amount of the crankshaft 4 increases or decreases in accordance with the combustion torque, the change amount of the rotation fluctuation amount due to the correction of the fuel injection amount is obtained by multiplying the amount of increase or decrease in the combustion torque due to the correction of the fuel injection amount by a predetermined factor or the like. Then, the obtained change amount of the rotation fluctuation amount is adjusted to the rotation fluctuation amount before the predetermined angle.

On the other hand, when a negative determination is made in S3 due to the fact that the precondition is not satisfied, the fuel injection correction control is not executed (S12). Therefore, the determination thresholds for determining the presence or absence of misfire by the misfire determination unit 34 are also not corrected (S22). That is, when misfire is determined on the basis of the past combustion torque before the correction of the fuel injection amount, the average value thereof, the combustion torque of another cylinder, or the rotation variation amount of the crankshaft 4, the rotation variation amount before a predetermined angle is set as the determination threshold value.

Following S21 and S22, it is determined whether or not the precondition for performing misfire determination is satisfied (S23). This S23 determines, for example, whether or not the rotational speed of the crankshaft 4 is equal to or greater than a predetermined rotational speed after starting the engine, that is, whether or not the number of samples of the previous combustion torque is equal to or greater than a predetermined number, or whether or not the change of the fuel injection amount by the fuel injection control is completed.

If a negative determination is made by S23 due to the fact that the precondition for misfire determination is not satisfied, this routine is terminated once. On the contrary, when a positive determination is made in S23 because the precondition for the misfire determination is satisfied, the misfire determination process is executed (S24).

In this control example, the misfire determination unit 34 compares the combustion torque at the time when the routine is executed with the past combustion torque to determine whether or not there is a misfire. Therefore, when the misfire determination process is executed, the combustion torque generated by injecting the fuel injection amount corrected by S4 is detected, and it is determined whether or not the detected actual combustion torque is equal to or less than the determination threshold (S25). That is, when the determination threshold is corrected by S21, it is determined whether or not the actual combustion torque is equal to or less than the corrected determination threshold. When S22 is executed and the determination threshold is not corrected, it is determined whether the actual combustion torque is equal to or less than the previous combustion torque before correcting the fuel injection amount.

When the actual combustion torque is determined to be equal to or less than the determination threshold value and is determined to be positive in S25, it is determined that a misfire error has occurred (S26). On the contrary, when the actual combustion torque is determined to be higher than the determination threshold value and thus is determined to be negative in S25, it is determined that a misfire error has not occurred, that is, it is determined to be normal (S27), and this routine is terminated once.

In the above-described control example, the fuel injection amount is corrected so as to suppress the variation in the combustion torque. Then, the actual combustion torque (actual rotation fluctuation amount) caused by the injection of the corrected fuel injection amount is compared with the combustion torque (or rotation fluctuation amount) changed by correcting the fuel injection amount, and the corrected determination threshold value to determine the presence or absence of misfire. Therefore, it is possible to reduce variation in the combustion torque caused by the execution of the ignition retardation control, and to achieve both the determination of the misfire. That is, it is possible to suppress generation of vibration due to variation in combustion torque while determining misfire. As a consequence, the ignition retardation control can be promoted, and the catalytic device 19 can be rapidly activated and GPF 20 can be rapidly regenerated.

The control example illustrated in FIG. 6 is configured to obtain a virtual combustion torque obtained by increasing or decreasing the amount of change in the combustion torque due to the correction of the fuel injection amount from the actual combustion torque after the correction of the fuel injection amount. Then, the virtual combustion torque is compared with a determination threshold value for determining the presence or absence of misfire to determine the presence or absence of misfire. Note that the same steps as those of the control example shown in FIGS. 3 to 5 are denoted by the same reference numerals, and the description thereof will be omitted.

In the control illustrated in FIG. 6, the virtual combustion torque is calculated after S5 (S31). This S31 calculates the combustion torque generated when the fuel injection amount is not corrected as the virtual combustion torque. Therefore, in S31, the combustion torque after the fuel injection amount is corrected is detected, and the increase/decrease amount of the combustion torque due to the correction of the fuel injection amount is adjusted from the detected actual combustion torque. Specifically, when the fuel injection amount is increased by S5, the torque increased by increasing the fuel injection amount is subtracted from the actual combustion torque. On the contrary, when the fuel injection amount is reduced by S5, the torque reduced by reducing the fuel injection amount is added to the actual combustion torque.

When the misfire determination unit 34 determines the misfire based on the rotation fluctuation amount of the crankshaft 4, the actual rotation fluctuation amount of the crankshaft 4 after the correction of the fuel injection amount is detected, and the increase/decrease amount of the rotation fluctuation amount due to the correction of the fuel injection amount may be adjusted from the detected actual rotation fluctuation amount. The amount of increase or decrease in the amount of rotation fluctuation caused by the correction of the fuel injection amount can be obtained based on the amount of increase or decrease in the combustion torque caused by the correction of the fuel injection amount as described above.

Then, in the control example shown in FIG. 6, when the misfire determination process is executed in S24, the misfire determination unit 34 determines whether or not the virtual combustion torque calculated by S31 is equal to or less than the determination threshold such as the previous combustion torque before correcting the fuel injection amount, the average value thereof, and the combustion torque of the other cylinders (S32).

When the virtual combustion torque is determined to be equal to or less than the determination threshold value and is determined to be positive in S32, it is determined that a misfire error has occurred (S26). On the contrary, when the virtual combustion torque is determined to be higher than the determination threshold value by S32 and thus is determined to be negative, a misfire error has not occurred, that is, it is determined to be normal (S27), and this routine is terminated once.

In the above-described control example, the fuel injection amount is corrected so as to suppress the variation in the combustion torque. A virtual combustion torque is obtained by adjusting the amount of combustion torque (or the amount of rotation fluctuation) that changes by correcting the fuel injection amount from the actual combustion torque (the amount of actual rotation fluctuation) caused by injecting the corrected fuel injection amount, and the virtual combustion torque is compared with a determination threshold value to determine whether or not there is a misfire. Therefore, it is possible to reduce variation in the combustion torque caused by the execution of the ignition retardation control, and to achieve both the determination of the misfire. That is, it is possible to suppress generation of vibration due to variation in combustion torque while determining misfire. As a consequence, the ignition retardation control can be promoted, and the catalytic device 19 can be rapidly activated and GPF 20 can be rapidly regenerated.

As described above, since the amount of retardation of the ignition timing can be increased by executing the fuel injection correction control, GPF 20 can be quickly regenerated, but the temperature increase amount of GPF 20 caused by the misfire is faster than when the normal ignition retardation control that does not execute the fuel injection control is executed. That is, the frequency of occurrence (number of occurrence) of misfire reaching the upper limit temperature determined to protect GPF 20 is reduced. Therefore, the control device according to the embodiment of the present disclosure is configured to change thresholds for determining abnormal heating of GPF 20 according to whether or not the fuel-injection-correction control is executed.

Figure 7:
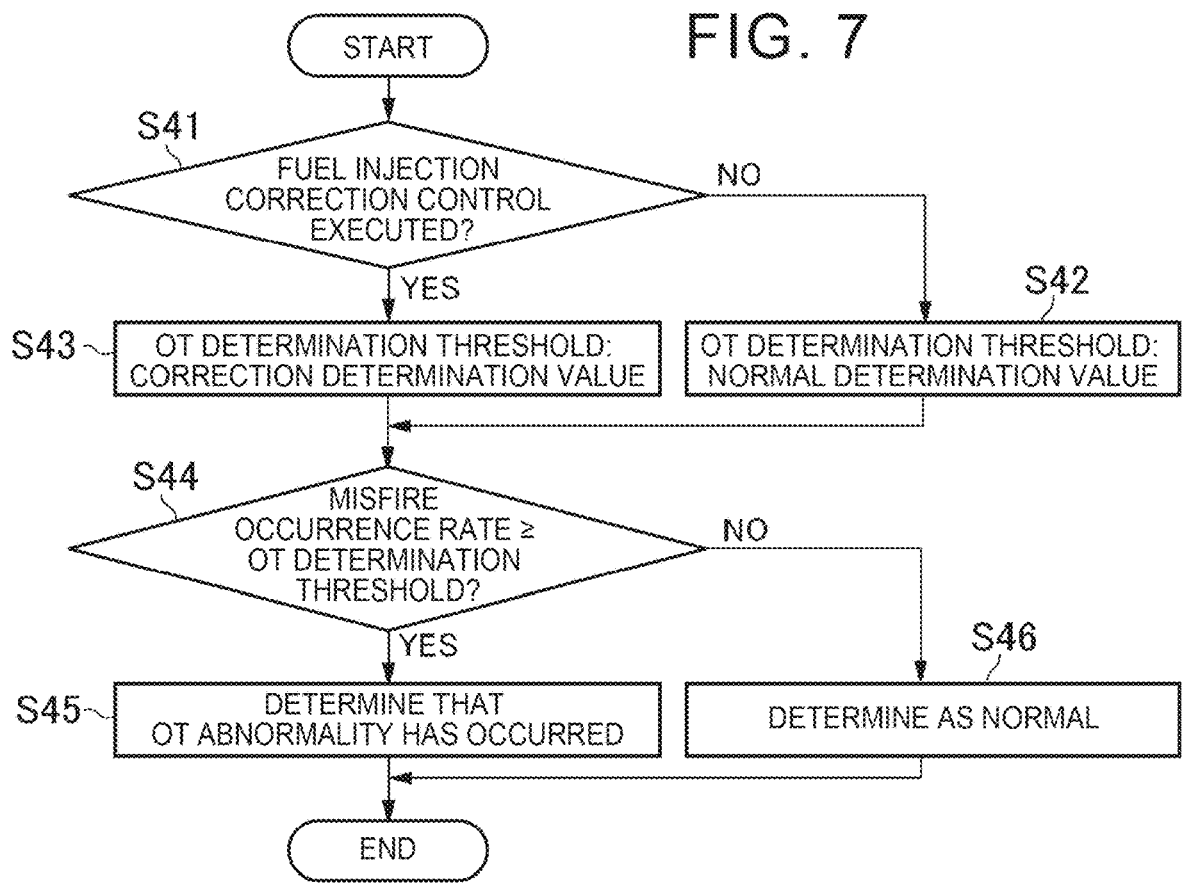
FIG. 7 is a flowchart illustrating a control example in which an OT determination threshold is changed according to whether fuel injection correction control is executed.
Figure 9:
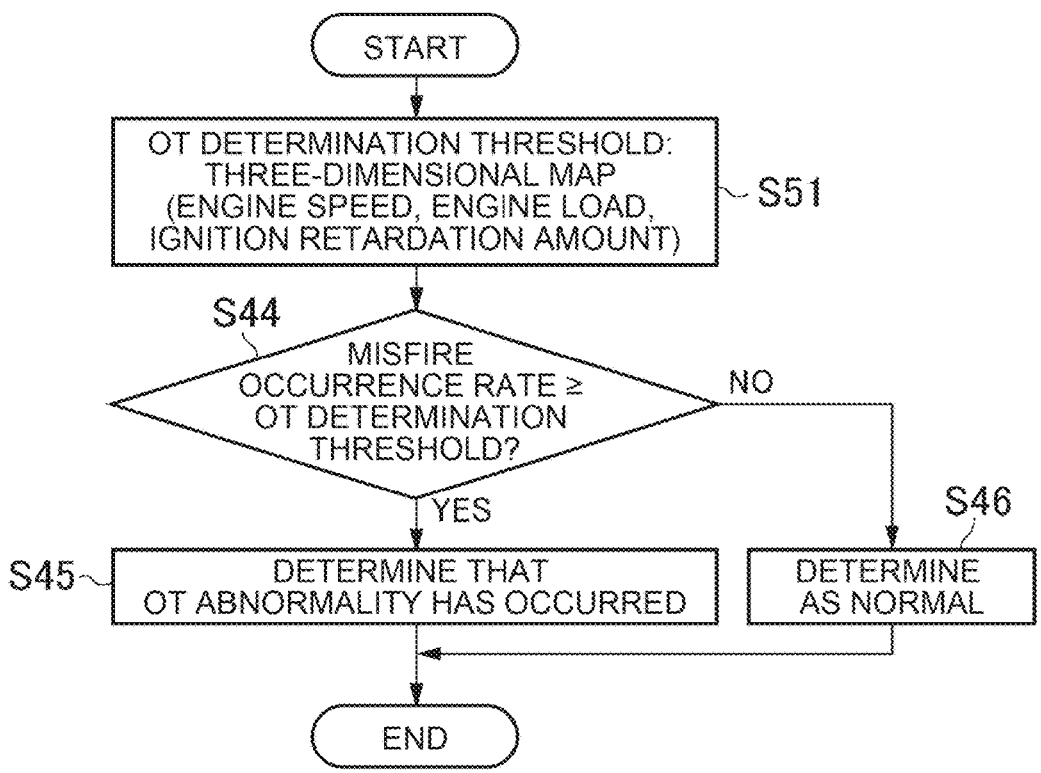
FIG. 9 is a flowchart illustrating a control example in which the OT determination threshold is set based on a three-dimensional map using the engine speed, engine load, and ignition retardation amount as parameters.
Figure 10:
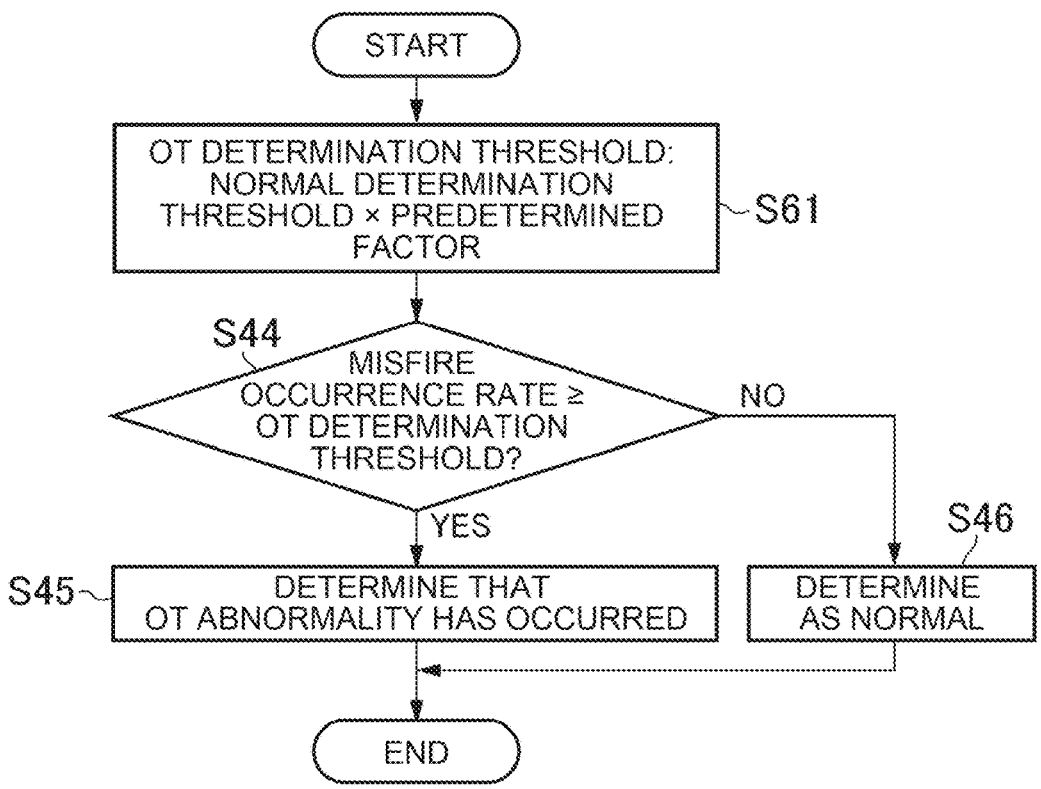
FIG. 10 is a flowchart illustrating a control example in which the OT determination threshold is set according to the ignition retardation amount.

FIG. 7, FIG. 9, and FIG. 10 are flowcharts for explaining the control example, and can be executed following the control examples of FIGS. 4 to 6. The control illustrated in FIG. 7 is configured to change thresholds for determining abnormal heating of GPF 20 according to whether or not the fuel-injection correction control is executed. Therefore, first, it is determined whether or not the fuel-injection-correction control has been executed (S41). S41 determines whether or not the ignition retardation amount is increased more than the ignition retardation amount when the fuel injection correction control is not executed by determining that the fuel injection correction control is executed. Note that the determination can be made based on whether S5 has been executed.

Figure 8:
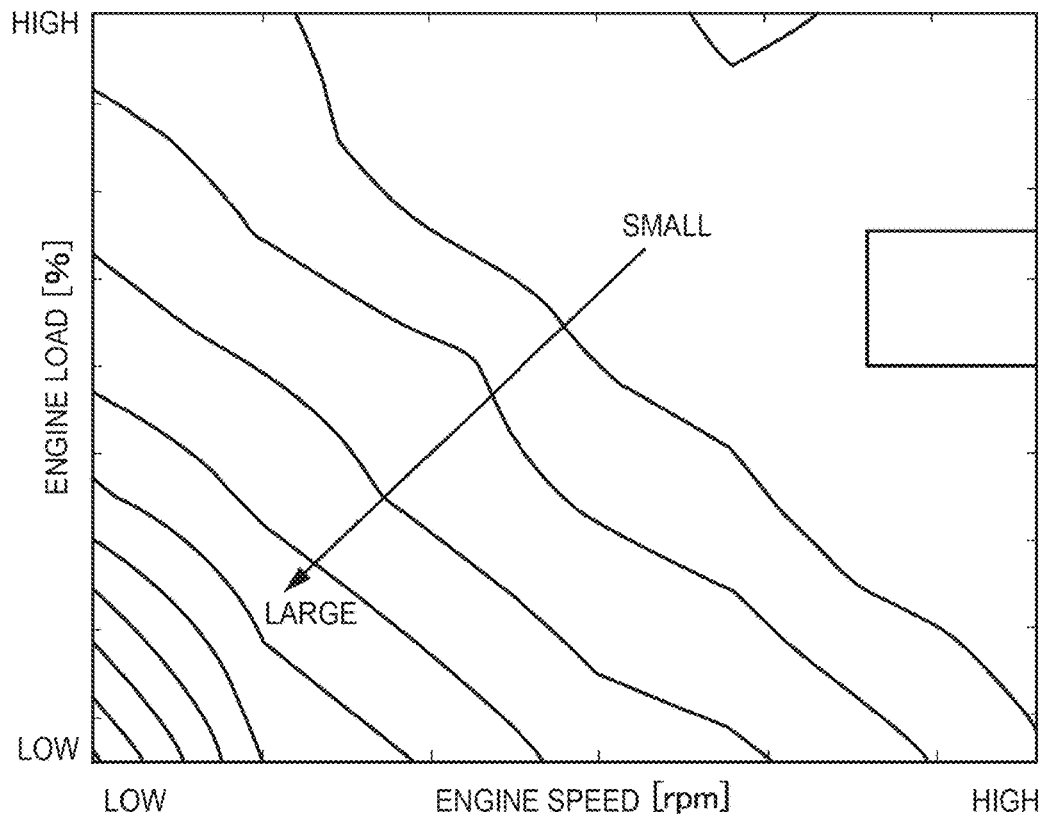
FIG. 8 is a diagram illustrating an example of a misfire rate map.

When a negative determination is made in S41 due to the fact that the fuel-injection-correction control is not executed, a predetermined normal determination value is set as a threshold value (OT determination threshold value) for determination of abnormal heating (S42). The temperature of GPF 20 increases according to the degree of occurrence of misfire as described above, so that the misfire rate (OT misfire rate) can be adopted as the threshold for determination of abnormal heating. OT misfire rate is shown in FIG. 8 as a map. In OT misfire rate map shown in FIG. 8, the occurrence rate of misfire in which GPF 20 is abnormally heated is determined in advance by experimentation or the like using the engine speed and the engine load as parameters. OT misfire rate map is stored in ECU 26 (overtemperature determination unit 35). As shown in FIG. 8, OT misfire rate map is configured such that OT misfire rate (i.e., the normal determination value) is set larger as the engine speed is lower, and OT misfire rate (i.e., the normal determination value) is set larger as the engine load is lower. Incidentally, the misfire occurrence rate is a ratio of the number of times of occurrence of misfire (number of times of occurrence of misfire/number of times of predetermined combustion) to the predetermined number of times of combustion in the engine 1 (that is, corresponding to the engine speed). That is, the occurrence rate of misfire can be determined by accumulating misfire occurring in each of the cylinders #1, #2, #3, and #4 to determine the number of times the misfire has occurred.

Therefore, in S42, OT determination thresholds are determined by detecting the engine speed and the engine load and referring to OT misfire rate map. Incidentally, since the occurrence rate of misfire is the number of misfire occurrence among the predetermined number of burns, the occurrence rate of misfire and the number of misfire occurrence are substantially the same.

On the contrary, when yes in S41 due to the execution of the fuel-injection correction control, a correction determination value determined to be smaller in the occurrence rate of a misfire than the normal determination value is set as OT determination threshold (S43). Similarly, in this S43, the occurrence rate of a misfire in which GPF 20 is abnormally heated by operating the engine 1 with the ignition retardation amount that can be set when the fuel injection correction control is executed is obtained experimentally. The misfire occurrence rate can be mapped and stored in ECU 26 to obtain a corrected determination. Even if the engine speed and the engine load are the same as in the normal state, GPF 20 is abnormally heated at a low misfire occurrence rate.

Following S42 and S43, it is determined whether the misfire occurrence rate is greater than or equal to OT determination thresholds (S44). That is, in ECU 26, each time misfire abnormality determination is performed by executing the control illustrated in FIGS. 4 to 6, the history is stored, and the misfire occurrence rate at a predetermined number of burns is calculated. Then, in S44, the misfire occurrence rate is compared with OT determination thresholds.

If the misfire occurrence rate is greater than or equal to OT determination threshold and is determined positively in S44, an OT anomaly determination is made (S45). On the contrary, when the misfire occurrence rate is less than OT determination thresholds and thus a negative determination is made in S44, a normal determination is made (S46), and this routine is terminated once. When OT abnormality determination is performed by S45, for example, the driver may be warned by displaying an indication that GPF 20 is abnormally heated on the instrument panel, or control may be performed to limit the power of the engine 1 so as to reduce a further increase in temperature of GPF 20.

As described above, when the ignition retardation amount is increased by executing the fuel-injection correction control, OT determination thresholds are changed to a misfire occurrence rate smaller than that in the case of the ignition retardation amount in the normal ignition retardation control, so that it is possible to reduce abnormal heating of GPF 20 or to accurately determine abnormal heating of GPF 20.

The control example illustrated in FIG. 9 differs from the control example illustrated in FIG. 7 only in the unit that sets OT determination thresholds. Specifically, in the control illustrated in FIG. 9, in addition to the engine speed and the engine load, OT misfire rate map (three-dimensional map) with the ignition retardation amount as a parameter is referred to, and after OT determination thresholds are set (S51), the above S44 and subsequent steps are executed. OT misfire rate map can be determined such that OT determination thresholds (misfire occurrence rate) become smaller as the ignition retardation amount becomes larger.

As described above, by determining OT determination threshold based on OT misfire rate map using the ignition retardation amount as a parameter, even when the ignition retardation amount is arbitrarily changed, it is possible to set OT determination threshold corresponding to the ignition retardation amount. Consequently, occurrence of abnormal heating of GPF 20 can be suppressed, or abnormal heating of GPF 20 can be accurately determined.

The control example illustrated in FIG. 10 differs from the control examples illustrated in FIGS. 7 and 9 only in the unit that sets OT determination thresholds. Specifically, in the control illustrated in FIG. 10, after OT determination threshold is set by multiplying the normal determination threshold by a predetermined factor determined in accordance with the ignition retardation amount (S61), the above S44 and subsequent steps are executed. This predetermined factor is a factor smaller than "1", and is set to a smaller value as the ignition retardation amount increases.

As described above, by determining OT determination threshold by multiplying the normal determination threshold by a predetermined factor corresponding to the ignition retardation amount, even when the ignition retardation amount is arbitrarily changed, OT determination threshold corresponding to the ignition retardation amount can be set. Consequently, occurrence of abnormal heating of GPF 20 can be suppressed, or abnormal heating of GPF 20 can be accurately determined.

In the above-described control example, since the detection speed of the first motor 2 is high and the detection accuracy is good, the combustion torques of the cylinders #1, #2, #3, and #4 is calculated from the torque acting on the first motor 2 by the first motor 2. However, the individual cylinder torque calculation unit according to the embodiment of the present disclosure may be configured to detect the combustion torques of the cylinders #1, #2, #3, and #4 as long as the combustion torque can be detected by other sensors. Further, the internal combustion engine according to the embodiment of the present disclosure is not limited to the internal combustion engine that is mounted on a so-called series-parallel type hybrid electric vehicle configured as shown in FIG. 1, and may be mounted on a series-type hybrid electric vehicle or a parallel-type hybrid electric vehicle, or may be mounted on a so-called conventional vehicle that includes only an engine as a driving force source.

What is claimed is:

1. A control device for an internal combustion engine that is configured to perform ignition retardation control for retarding an ignition timing of igniting an air-fuel mixture in a combustion chamber from the ignition timing during a predetermined normal operation, the control device comprising a controller configured to control the internal combustion engine, wherein:
the controller includes
an individual cylinder torque calculation unit configured to obtain an amount of variation among combustion torques of individual cylinders during execution of the ignition retardation control,
an injection amount correction unit configured to correct fuel injection amounts for the individual cylinders so as to reduce the amount of variation among the combustion torques of the individual cylinders obtained by the individual cylinder torque calculation unit, and
a misfire determination unit configured to determine a misfire in a predetermined one of the individual cylinders based on the combustion torque of the predetermined cylinder or a rotational speed of the internal combustion engine; and
when the combustion torque of any of the individual cylinders is equal to or less than a predetermined torque, the injection amount correction unit does not correct the fuel injection amounts for the individual cylinders.

2. A control device for an internal combustion engine that is configured to perform ignition retardation control for retarding an ignition timing of igniting an air-fuel mixture in a combustion chamber from the ignition timing during a predetermined normal operation, the control device comprising a controller configured to control the internal combustion engine, wherein:
the controller includes
an individual cylinder torque calculation unit configured to obtain an amount of variation among combustion torques of individual cylinders during execution of the ignition retardation control,
an injection amount correction unit configured to correct fuel injection amounts for the individual cylinders so as to reduce the amount of variation among the combustion torques of the individual cylinders obtained by the individual cylinder torque calculation unit, and
a misfire determination unit configured to determine a misfire in a predetermined one of the individual cylinders based on either the combustion torque or a rotational speed of the internal combustion engine that is associated with combustion in the predetermined cylinder and on a predetermined determination threshold; and
when the fuel injection amounts for the individual cylinders are corrected by the injection amount correction unit, the misfire determination unit corrects the determination threshold by a change in the torque or the rotational speed that corresponds to an amount of correction of the fuel injection amount for the predetermined cylinder.

3. The control device according to claim 2 further comprising a filter configured to capture particulate matter contained in exhaust emissions discharged from the individual cylinders, wherein the controller further includes an overtemperature determination unit configured to determine abnormal heating of the filter when an occurrence rate of the misfire determined by the misfire determination unit is equal to or higher than a predetermined rate.

4. The control device according to claim 3, wherein the overtemperature determination unit sets the predetermined rate when the fuel injection amounts for the individual cylinders are corrected to a value smaller than the predetermined rate when the fuel injection amounts for the individual cylinders are not corrected.

5. The control device according to claim 3, wherein when the fuel injection amounts for the individual cylinders are corrected, the overtemperature determination unit determines that the abnormal heating of the filter has occurred when the occurrence rate of the misfire determined by the misfire determination unit is equal to or higher than the predetermined rate multiplied by a factor smaller than 1.

6. The control device according to claim 3, wherein the overtemperature determination unit includes a three-dimensional map that determines the predetermined rate using the rotational speed of the internal combustion engine, a load of the internal combustion engine, and an amount of retardation of the ignition timing as parameters.

7. A control device for an internal combustion engine that is configured to perform ignition retardation control for retarding an ignition timing of igniting an air-fuel mixture in a combustion chamber from the ignition timing during a predetermined normal operation, the control device comprising a controller configured to control the internal combustion engine, wherein:
the controller includes
an individual cylinder torque calculation unit configured to obtain an amount of variation among combustion torques of individual cylinders during execution of the ignition retardation control,
an injection amount correction unit configured to correct fuel injection amounts for the individual cylinders so as to reduce the amount of variation among the combustion torques of the individual cylinders obtained by the individual cylinder torque calculation unit, and
a misfire determination unit configured to determine a misfire in a predetermined one of the individual cylinders based on either the combustion torque or a rotational speed of the internal combustion engine that is associated with combustion in the predetermined cylinder and on a predetermined determination threshold; and
when the fuel injection amounts for the individual cylinders are corrected by the injection amount correction unit, the misfire determination unit corrects the combustion torque or the rotational speed by a change in the torque or the rotational speed that corresponds to an amount of correction of the fuel injection amount for the predetermined cylinder.

8. The control device according to claim 7 further comprising a filter configured to capture particulate matter contained in exhaust emissions discharged from the individual cylinders, wherein the controller further includes an overtemperature determination unit configured to determine abnormal heating of the filter when an occurrence rate of the misfire determined by the misfire determination unit is equal to or higher than a predetermined rate.

9. The control device according to claim 8, wherein the overtemperature determination unit sets the predetermined rate when the fuel injection amounts for the individual cylinders are corrected to a value smaller than the predetermined rate when the fuel injection amounts for the individual cylinders are not corrected.

10. The control device according to claim 8, wherein when the fuel injection amounts for the individual cylinders are corrected, the overtemperature determination unit determines that the abnormal heating of the filter has occurred when the occurrence rate of the misfire determined by the misfire determination unit is equal to or higher than the predetermined rate multiplied by a factor smaller than 1.

11. The control device according to claim 8, wherein the overtemperature determination unit includes a three-dimensional map that determines the predetermined rate using the rotational speed of the internal combustion engine, a load of the internal combustion engine, and an amount of retardation of the ignition timing as parameters.

* * * * *